(12) United States Patent
Su

(10) Patent No.: US 8,482,912 B2
(45) Date of Patent: Jul. 9, 2013

(54) FIXING APPARATUS FOR FLAT PANEL DISPLAY DEVICES

(76) Inventor: Yuanzhi Su, Jiangmen (CN)

(*) Notice: Subject to any disclaimer, the term of this patent is extended or adjusted under 35 U.S.C. 154(b) by 20 days.

(21) Appl. No.: 13/476,271

(22) Filed: May 21, 2012

(65) Prior Publication Data

US 2012/0227241 A1  Sep. 13, 2012

Related U.S. Application Data

(62) Division of application No. 13/018,489, filed on Feb. 1, 2011, now abandoned.

(30) Foreign Application Priority Data

Nov. 1, 2010 (CN) .......................... 2010 1 0526974

(51) Int. Cl.
*G06F 1/16* (2006.01)
(52) U.S. Cl.
USPC .................................. 361/679.3; 361/679.29
(58) Field of Classification Search
USPC .................. 220/23.9; 312/223.2; 361/679.41, 361/679.02, 679.03, 679.29, 679.3, 679.56, 361/796, 752, 759; 248/346.01, 346.05, 346.5, 248/346.04, 686, 682, 468, 478
See application file for complete search history.

(56) References Cited

U.S. PATENT DOCUMENTS

| | | | |
|---|---|---|---|
| 5,859,628 A * | 1/1999 | Ross et al. | 345/173 |
| 5,996,956 A | 12/1999 | Shawver | 248/309.1 |
| 6,456,487 B1 | 9/2002 | Hetterick | 361/679.3 |
| 6,536,589 B2 | 3/2003 | Chang | 206/320 |
| D516,553 S | 3/2006 | Richardson et al. | D14/341 |
| 7,495,895 B2 | 2/2009 | Carnevali | 361/679.26 |
| 7,597,394 B2 | 10/2009 | Liu | 297/217.3 |
| 7,609,512 B2 | 10/2009 | Richardson et al. | 361/679.41 |
| 7,643,274 B2 | 1/2010 | Bekele | 361/679.02 |
| D615,535 S | 5/2010 | Richardson et al. | D14/250 |
| 7,933,122 B2 | 4/2011 | Richardson et al. | 371/679.55 |
| 7,938,260 B2 | 5/2011 | Lin | 206/320 |
| 2003/0179543 A1 | 9/2003 | Sri-Jayantha et al. | 361/683 |
| 2005/0139498 A1 | 6/2005 | Goros | 206/320 |
| 2010/0244638 A1 | 9/2010 | Law | 312/223.1 |
| 2010/0265652 A1 | 10/2010 | Agata et al. | 361/679.41 |
| 2010/0284138 A1 * | 11/2010 | Lin | 361/679.27 |
| 2012/0104209 A1 | 5/2012 | Su | |

FOREIGN PATENT DOCUMENTS

WO   WO2012058827 A1   5/2012

* cited by examiner

*Primary Examiner* — Alfred J Wujciak

(57) ABSTRACT

A fixing apparatus for a flat panel display device includes a frame having an open cavity. First and second positioning sidewalls extend from the frame and are located above and parallel with the open cavity. A movable stop block is mounted in the open cavity and below the first positioning sidewall. As such the flat panel device is easily fixed and improved fixing strength is attained.

1 Claim, 3 Drawing Sheets

FIXING APPARATUS FOR FLAT PANEL DISPLAY DEVICES

CROSS-REFERENCE TO RELATED APPLICATIONS

This application is a divisional of co-pending U.S. patent application Ser. No. 13/018,489 filed Feb. 1, 2011, which claims priority to Chinese Patent No. 201010526974.5, filed on Nov. 1, 2010 under the title "FIXING APPARATUS FOR FLAT PANEL DISPLAY DEVICES", the contents of which are incorporated by reference in their entirety.

FIELD

The present invention relates to a fixing apparatus for flat panel display devices

BACKGROUND

At present flat panel display devices have been widely used because of numerous advantages, such as ingenious appearances, lightweight designs, slim sizes, powerful functions, low power consumption, etc. In consideration of portability, these flat panel display devices are usually designed to be super slim, small, and more particularly without a rigid mechanical fixing interface. Thus, a user may easily get his hands tired after holding a portable display device for a while.

Furthermore, under some circumstances, users may not be able to hold a portable flat panel display device by hand. An extra apparatus may be needed for fixing it on a place. For example, an apparatus may be needed to fix a flat panel device: on a car dashboard as a GPS or car-carrying computer; behind a front seat of a car as a video player; on a portable speaker; on a wall as a main controller for a smart home, etc.

All of the above uses require a simple, stable and aesthetic fixing apparatus to attach a flat panel display device to a surface safely, steadily and reliably. In particular, in a move, for example, an apparatus is needed to provide a fixed and protective device for car carry display devices. The apparatus needs to be capable of handling rapid acceleration (taking off or braking) events. Current fixing apparatuses for these flat panel display devices usually consist of a frame formed of four elongated bars. Users have to assemble the frame bars to enclose panel display equipment. The current fixing apparatuses are rather complicated, inconvenient to setup, unstable, and unsafe to use.

SUMMARY

The purpose of present invention is to provide a fixing apparatus for portable flat panel display devices with a rational structure and easy installation.

To solve the above-mentioned problems, the present invention provides a fixing apparatus for a portable flat panel display device. The fixing apparatus includes a frame having an open cavity. First and second positioning sidewalls extend from the frame and are located above and parallel with the open cavity. A movable stop block is mounted in the open cavity and below the first positioning sidewall. An extension of the first positioning sidewall is longer than an extension of the second positioning sidewall.

As a modification, the fixing apparatus further includes an auxiliary pop-up mechanism mounted in the open cavity. The auxiliary pop-up mechanism includes a spring chamber connecting to the open cavity, a spring mounted in the spring chamber, and a movable block attached to the spring and extending into the open cavity. The end of the movable block has a hemispherical shape.

As a modification, the fixing apparatus further includes a connector mounted in the open cavity below the second positioning sidewall and connects the flat panel display device to an external device. With such a structure, a user could easily engage a flat panel display device into a fixing apparatus and fix it in a place stably.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
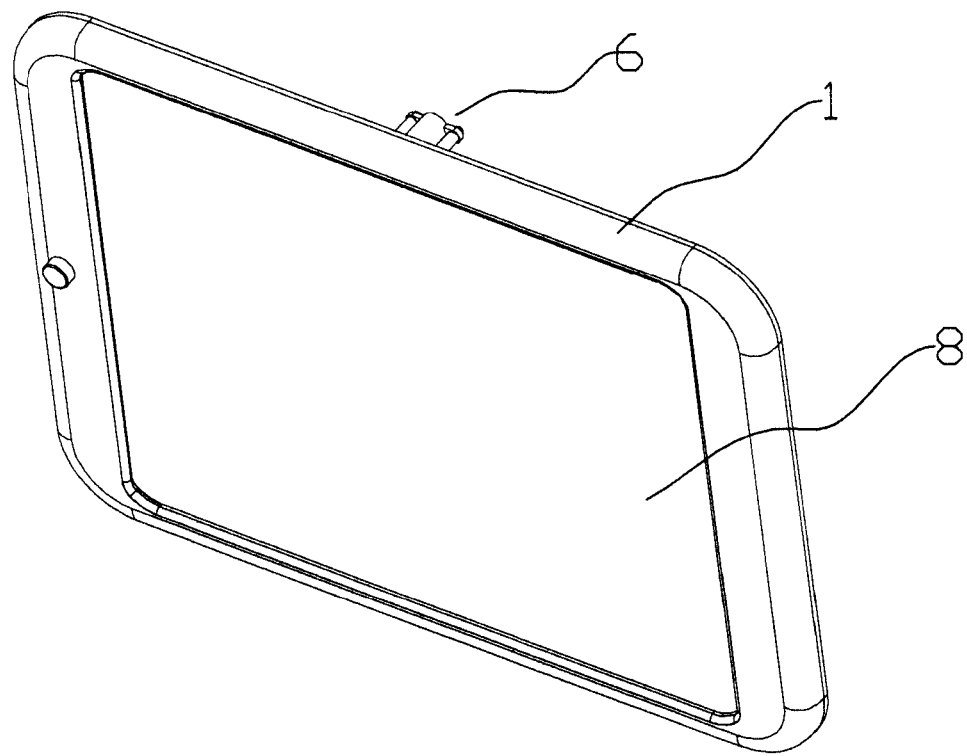
FIG. 1 is a schematic view illustrating a fixing apparatus for flat panel display devices in accordance with the present disclosure.

In reference to FIGS. 1 to 3, a fixing apparatus for flat panel display devices disclosed herein includes: a frame 1 having an open cavity 2; first and a second positioning sidewalls 3, 4 extending from the frame 1 and located above and parallel with the open cavity 2; and a movable stop block 5 mounted in the open cavity 2 and below the first positioning sidewall 3. The extension of the first positioning sidewall 3 is longer than the extension of the second positioning sidewall 4.

To engage, a user first places one side of a display device 8 into the open cavity 2 under the first positioning sidewall 3 through the opening thereof. The user then presses down the other side of the display device 8 to snap the display device 8 into the open cavity 2. After that, the user transversally pushes the display device 8 towards the side of the second positioning sidewall 4. Finally, the user pushes out the stop block 5 into a gap between the display device 8 and the lateral wall of open cavity 2 under the first positioning sidewall 3. Thus, the display device 8 is fixed in the open cavity 2 by the first and second positioning sidewalls 3, 4 and the stop block 5.

Figure 3:
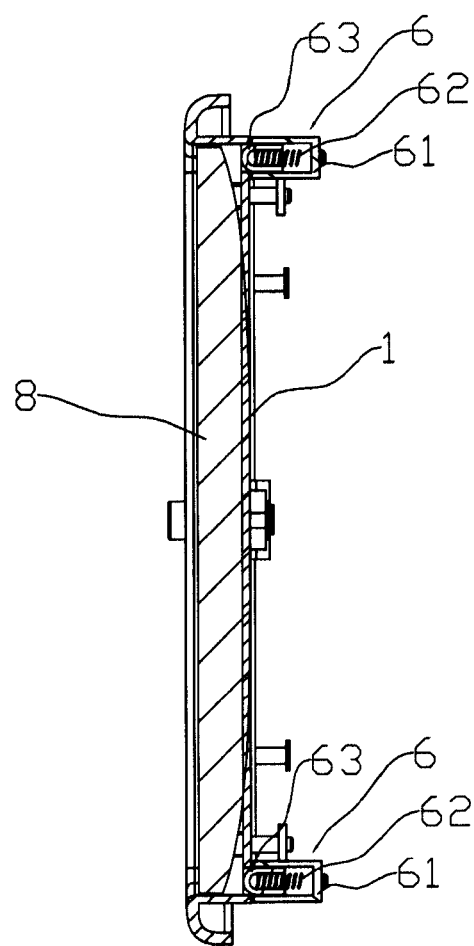
FIG. 3 is a longitudinal sectional view of a fixing apparatus for flat panel display devices in accordance with the present disclosure.

In one implementation, the fixing apparatus further includes an auxiliary pop-up mechanism 6 mounted in the open cavity 2, as FIG. 3 shows. The auxiliary pop-up mechanism 6 includes a spring chamber 61 connected to the open cavity 2. A spring 62 is mounted in the spring chamber 61, and a movable block 63 extending into the cavity 2 and attached to the spring 62. In this way, to disengage, the user only needs to draw back the stop block 5 to release the display device 8 and transversally push back the display device 8 towards the side of the first positioning sidewall 3. The display device 8 is automatically pushed out through the opening of the open cavity 2 by the movable block 63 under the spring force of the compressed spring 62. This allows the user to simply grab the display device 8 without any difficulties.

Furthermore, a contact end of the movable block 63 has a hemispheric shape, which facilitates the contact between the movable block 63 and the display device 8 and aids in avoiding damages on the surface of the display device 8.

Figure 2:
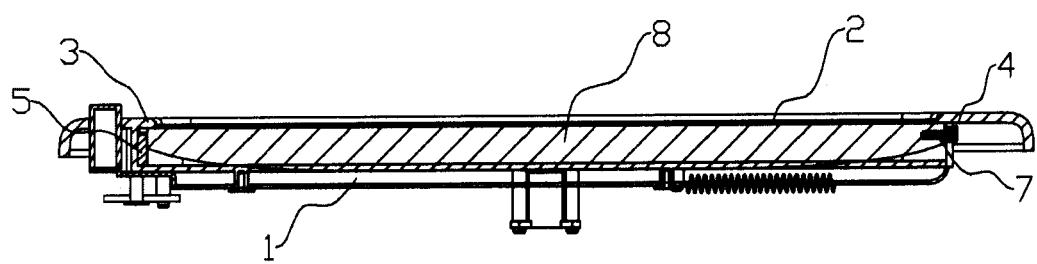
FIG. 2 is a transverse sectional view of a fixing apparatus for flat panel display devices in accordance with the present disclosure.

As FIG. 2 shows, the fixing apparatus for the flat panel display devices further includes a connector 7 mounted in the open cavity 2 and below the second positioning sidewall 4. The connector 7 is used to connect the display device 8 to an external device. For example, the connector 7 may be used to connect the display device 8 to a computer for transferring data.

The foregoing is considered as illustrative only of the principles of implementations disclosed herein. Since numerous modifications and changes will readily occur to those skilled in the art, it is not desired that the disclosed implementations be limiting to the exact construction and operation shown and described. Accordingly, all suitable modifications and equivalents may be resorted to, falling within the scope of the present disclosure.

What is claimed is:

1. A method for providing a fixing apparatus for a portable flat panel display device, comprising:

arranging first and second positioning sidewalls on opposite sides of a frame that defines a cavity in a first plane, wherein said first positioning sidewall extends from said frame in a first direction towards said cavity and above and parallel to said first plane, and wherein said second positioning sidewall extends from said frame in a second direction towards said cavity and said first positioning sidewall and above and parallel to said first plane, wherein said first direction and said second direction are opposite directions;

defining an opening between said first and second positioning sidewalls;

mounting a movable stop block in said cavity and between said first positioning sidewall and said frame;

wherein a first extension of said first positioning sidewall extends in said first direction toward said cavity longer than a second extension of said second positioning sidewall extends in said second direction towards said cavity and said first extension;

inserting one end of said flat panel display device through said opening and into said cavity under said first positioning sidewall and against said movable stop block;

inserting an opposite end of said flat panel display device through said opening and into said cavity;

moving said flat panel display device laterally towards said second sidewall; and moving said moveable stop block towards said second positioning sidewall to fix said flat panel display device in said cavity, wherein the first extension and second extension abut the edges of the flat panel display device.

* * * * *